W. V. TURNER.
FLUID PRESSURE BRAKE DEVICE.
APPLICATION FILED AUG. 22, 1918.
1,339,679.
Patented May 11, 1920.
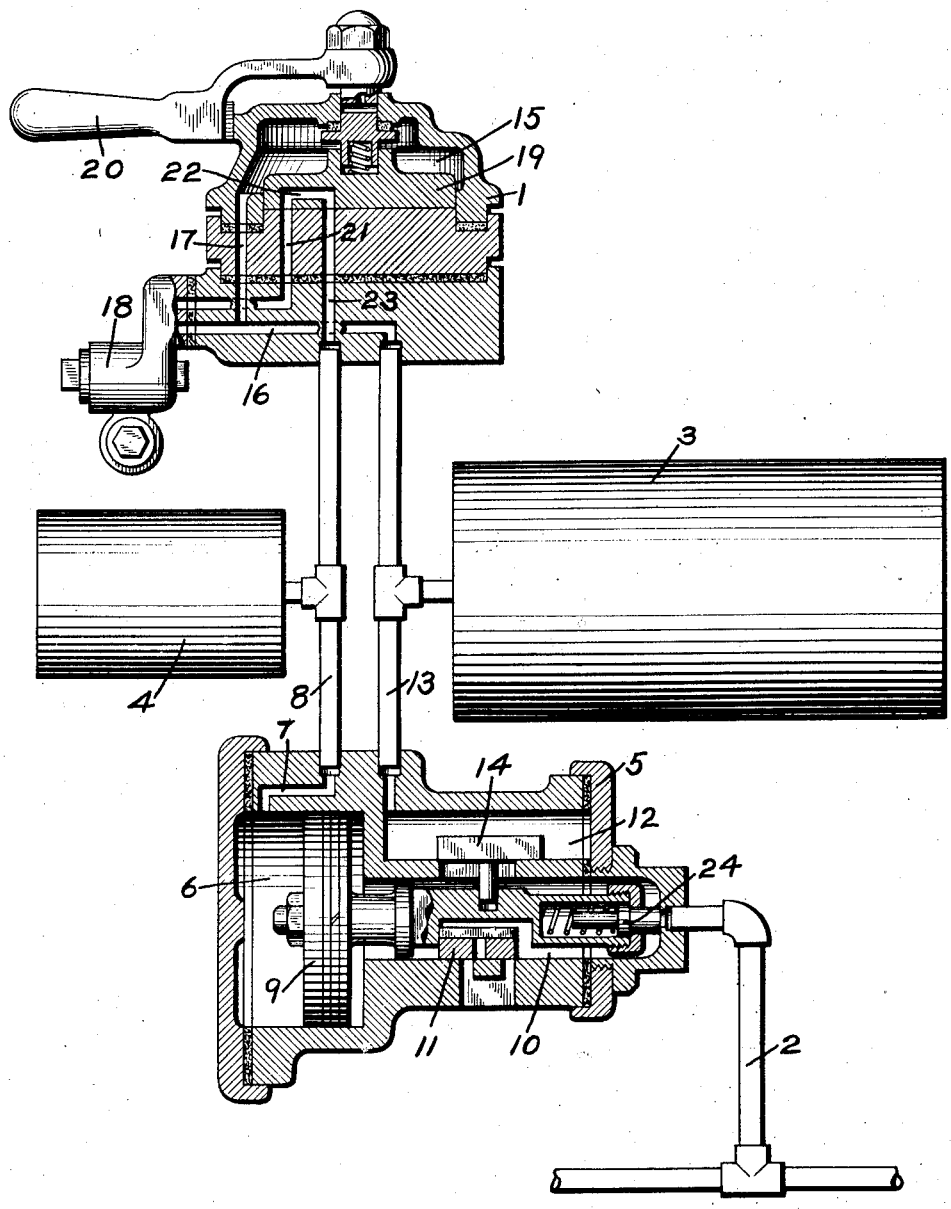
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,339,679.  Specification of Letters Patent.  Patented May 11, 1920.

Application filed August 22, 1918. Serial No. 250,938.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a brake pipe pressure maintaining device.

The principal object of my invention is to provide an improved device for maintaining the pressure in the brake pipe at any desired degree.

In the accompanying drawing, the single figure is a view, partly in section, of a locomotive brake apparatus for controlling the brake pipe pressure, showing my invention applied thereto.

As shown in the drawing, the construction may comprise a brake valve device 1, a brake pipe 2, a main reservoir 3, an equalizing reservoir 4, and a brake pipe pressure maintaining valve device 5.

The brake pipe pressure maintaining valve device 5 may comprise a casing, having a piston chamber 6, connected by passage 7 to a pipe 8 leading to the equalizing reservoir 4 and to the brake valve 1 and containing a piston 9, and having a valve chamber 10, connected to brake pipe 2 and containing a slide valve 11 adapted to be operated by piston 9 for venting fluid from the valve chamber 10 and the brake pipe 2.

The casing also has a valve chamber 12, connected to main reservoir pipe 13 and containing a slide valve 14, adapted to be operated by piston 9 for supplying fluid under pressure from the main reservoir 3 to valve chamber 10 and to brake pipe 2.

The brake valve device 1 may comprise the usual casing, having a valve chamber 15, connected by passage 17 to passage 16, which supplies fluid under pressure from the main reservoir to the feed valve device 18 of the usual construction and containing a rotary valve 19 adapted to be operated by handle 20.

In operation, if the brake valve handle is turned to running position, as shown in the drawing, fluid under pressure is supplied from the main reservoir 3, at the pressure at which the feed valve device 18 may be adjusted, to the equalizing reservoir 4 and the piston chamber 6, through passage 21, cavity 22 in rotary valve 19, and passage 23.

Piston 9 is then moved to the extreme right by fluid pressure supplied to piston chamber 6, and the valve 14 is opened to admit fluid from the main reservoir 3 to valve chamber 10 and the brake pipe 2.

When the pressure in the brake pipe 2 and valve chamber 10 has been increased to a degree slightly less than the pressure supplied to the piston chamber 6 and corresponding with the setting of feed valve 18, the pressure acting on the inner face of piston 9, aided by the spring stop 24, causes the movement of piston 9 and the valves 11 and 14 to lap position.

If the brake pipe pressure should fall below the degree at which the brake pipe pressure is to be maintained, due to leakage from the brake pipe, the higher pressure in piston chamber 6 will then actuate the piston 9 so as to again open the valve 14 and supply fluid to the brake pipe to compensate for the brake pipe leakage.

In order to make a reduction in brake pipe pressure to effect an application of the brakes, the brake valve handle 20 is turned to application position, in which fluid is vented from the equalizing reservoir 4 and from the piston chamber 6.

The reduction in pressure in piston chamber 6, permits the higher brake pipe pressure to shift the piston 9 outwardly, so as to open the exhaust valve 11 and thereby vent fluid from valve chamber 10 and the brake pipe 2 to the atmosphere.

When the pressure in the equalizing reservoir has been reduced to a point corresponding with the desired reduction in brake pipe pressure, the brake valve is lapped, and when the brake pipe pressure has reduced to a degree slightly less than the pressure in piston chamber 6, the piston 9 will move the valve 11 to lap position, thus cutting off the further venting of fluid from the brake pipe.

Having now described my invention, what I claim as new, and desire to secure by Letters Patent, is:—

1. In a fluid pressure brake, the combination with a brake pipe, an equalizing valve device, a feed valve device, and a brake valve having a position for supplying fluid from the feed valve device to the equalizing reservoir, of a valve device subject to the opposing pressures of the brake pipe and the equalizing reservoir for supplying fluid to the brake pipe, said valve device being the sole source of fluid pressure supply for the brake pipe.

2. In a fluid pressure brake, the combination with a brake pipe and an equalizing reservoir, of a valve device subject to the opposing pressures of the brake pipe and the equalizing reservoir for supplying and releasing fluid to and from the brake pipe.

3. In a fluid pressure brake, the combination with a brake pipe, an equalizing reservoir, and a brake valve for varying the pressure in the equalizing reservoir, of a valve device having a piston subject to the opposing pressures of the equalizing reservoir and the brake pipe and valve means operated by said piston for supplying and releasing fluid to and from the brake pipe.

4. In a fluid pressure brake, the combination with a brake pipe, an equalizing reservoir, and a brake valve for varying the pressure in the equalizing reservoir, of a valve device having a valve for supplying fluid to the brake pipe, a valve for releasing fluid from the brake pipe, and a piston, subject to the opposing pressures of the brake pipe and the equalizing reservoir for operating said valves.

5. In a fluid pressure brake, the combination with a brake pipe and an equalizing reservoir, of valve means for supplying and releasing fluid to and from the brake pipe and having an intermediate lap position, and a piston subject to the opposing pressures of the brake pipe and the equalizing reservoir for operating said valve means.

In testimony whereof I have hereunto set my hand.

WALTER V. TURNER.